D. R. YARNALL.
INLET WATER REGULATOR FOR WEIR METER CONSTRUCTION.
APPLICATION FILED APR. 1, 1912.
1,159,150.
Patented Nov. 2, 1915.
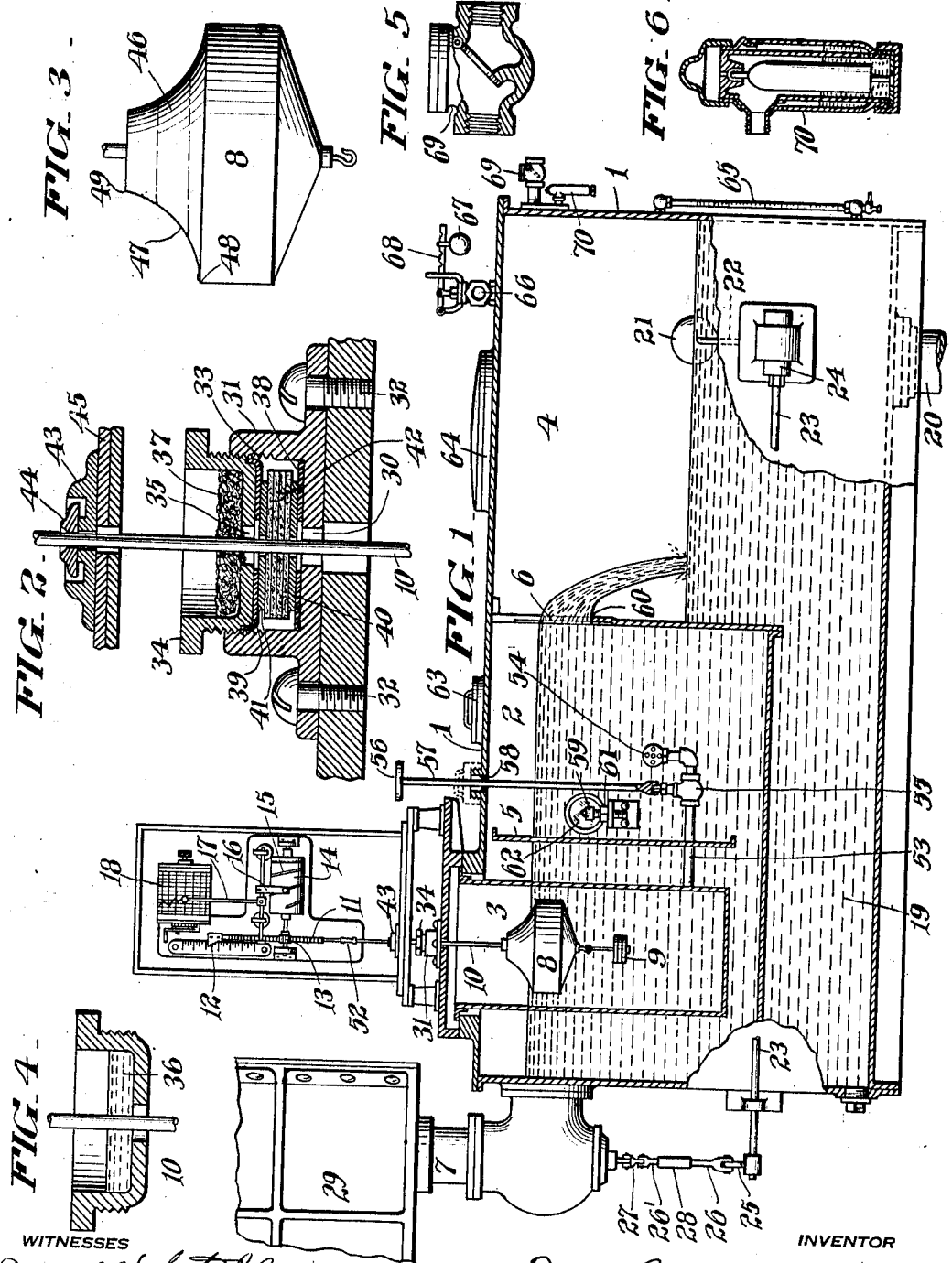

UNITED STATES PATENT OFFICE.

DAVID ROBERT YARNALL, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA.

INLET-WATER REGULATOR FOR WEIR-METER CONSTRUCTION.

1,159,150.    Specification of Letters Patent.    Patented Nov. 2, 1915.

Application filed April 1, 1912. Serial No. 687,630.

*To all whom it may concern:*

Be it known that I, DAVID ROBERT YARNALL, a citizen of the United States, residing at Philadelphia, in the county of Philadelphia and State of Pennsylvania, have invented a certain new and useful Inlet-Water Regulator for Wier-Meter Construction, of which the following is a specification.

The purpose of my invention is to insure continued desirable conditions of pressure within a meter tank.

A further purpose of my invention is to provide for any predetermined pressure limits within meter tanks and to vent steam and air therefrom.

A further purpose of my invention is to freely relieve meter tanks from air accumulation without interfering with any desired steam pressure therein.

A further purpose of my invention is to prevent the formation of a vacuum within meter tanks.

A further purpose of my invention is to release the pressure within meter tanks at any desired adjustable pressure point and to provide for adjustment of this point.

I have preferred to illustrate my invention by one form thereof which I have found to be simple, efficient and relatively inexpensive and which well illustrates the principles of my invention.

Figure 1 is a vertical longitudinal section of a preferred construction embodying my invention. Fig. 2 is an enlarged section of a portion of the structure in Fig. 1 showing the gland preferred by me. Fig. 3 is a side elevation of the form of float shown in Fig. 1. Fig. 4 is a broken vertical section of a modification of one of the glands in Fig. 2. Figs. 5 and 6 are sectional views of valves used by me.

Like numerals of reference indicate corresponding parts in the drawings.

The pressure-tight tank 1 is divided in the form shown into intercommunicating chambers 2, 3, 4, respectively, the weir chamber, the float chamber and the storage chamber. Within the weir chamber is placed a baffle plate 5 to prevent surging of the water at the point 6 where it passes over the weir, by reason of the inlet water supply at 7 from feed water heater, condenser or other suitable source which may or may not be under steam pressure.

The float chamber 3 contains float 8 shown as weighted at 9 and communicating its movement through rod 10 to rack 11. The rack carries an indicator 12 and operates a gear 13 by which drum 14 is rotated. The guide 15 on the drum is so formed as to move the arm 16 and, hence, the recording finger 17 axially of the drum at a rate proportionate to the increase or decrease of the flow of water over the weir so that the record upon the cylinder 18 may be integrated by planimeter methods. This recording mechanism is the well known Lea mechanism.

I have extended the storage chamber beneath the chamber 2 as at 19 so as to give any desired storage space for this water which has been measured at the expense merely of lifting the tank 2 and without enlarging the floor space required.

In order to control the inlet water as far as may be possible, to make its flow proportionate to the rate of withdrawal through pipe 20 by the pump I provide a float 21 upon lever arm 22 connected to rod 23 which operates through stuffing box 24 so as to translate movement of the float into rod rotation without losing the pressure conditions within the tank.

The rod 23 is provided at any desired point with a lever arm 25 which controls a valve in the intake 7 by means of rods 26 and 26' and arm 27. Any suitable turn buckle 28 provides for adjustment of the relative positions of these parts to set the valve for any height of storage water desired. Pipe 7 is shown, as leading from an open feed water heater 29.

In the form shown, the rod 10 passes freely through the space 30 in a box 31, retained in any suitable manner as by screws 32, and preferably internally threaded at 33 to provide for adjustment of the cup 34 therewith. The cup performs two functions; bringing pressure upon the packing, and holding the sealing and, preferably, lubricating liquid. The opening 35 in the cup, like that at 30 in the box, is also considerably larger than the rod and the cup is preferably filled with a heavy oil as at 36. I have obtained the best results with cylinder oil and have found that cotton waste in the oil, as at 37, assists in preventing evaporation of the oil and acts as a wick to maintain lubrication of the rod for a greater length of time than would be the case with oil alone. In Fig. 4 I have shown oil without the waste.

In the best form of my invention I place rubber packing 38 and 39 within box 31 and against the bottom of the box and under surface of the cap 34, respectively, placing plates 40 and 41 next to these rubber sheets and filling the space between these two plates with any suitable number of sheets, here shown as disks, of felt or similar material 42, soaked in a mixture of graphite and oil.

The pressure of the cap upon the content within the box 31 may be adjusted in each different application of my invention to correspond to the permissible friction against lateral movement of the sheets or disks, the character of oil seal used and other conditions determined by the exact design used and the judgment of the engineer. The body of oil within the cap itself constitutes a fluid seal and maintains the desired saturation of the disks of felt or other fibrous material and their proper lubrication against the plates and against the rod. Ordinarily the friction would be less between the plates and the rubber disks than between the plates and the felt, with the result that, if the gland be not in proper alinement with the rod, there will be movement of the entire group between and including the plates until this adjustment has been secured.

I have illustrated a well-known type of antivapor gland in the bottom of the recorder case, comprising a base plate 43 and movable cap 44, resting upon the bottom 45 of the case.

The depth of flotation of the float is adjusted by means of removable weights so that the water level is at some point upon the surface 46 of the upper part of the float and this surface is concave in longitudinal section through the axis of the float, as at 47, varying between tangency to the horizontal and to the vertical at 48 and 49 respectively.

The gland construction and allied parts, as well as the float, will be more fully described and their operation more fully explained in a co-pending application about to be filed by me.

Any suitable coupling 52 may be introduced between the rod 10 and the rack 11 to give them relative movement longitudinally for adjustment of the zero point of the cylinder 14.

I have connected the tank 3 with the tank 2 by means of a pipe 53 terminating in a screened end 54 and containing a valve 55 which is controlled from the outside by wheel 56 through rod 57 sealed by gland 58. The upper part of the chamber 3 is open freely to the surface pressure or vacuum conditions of chambers 2 and 4 since the spaces at the top between these chambers are not closed.

To assist in initial setting of the zero point of cylinder 14 I place a pin 59 on a level with the bottom of the weir at 60, making the point adjustable for the purpose of exact setting by forming it as a screw within bracket, locked therein by nut 61. For convenience in adjusting the instrument to zero while the meter is under pressure or a vacuum, peep holes 62 in line with the top of the pin are provided. One hole only shows in the illustration.

So that various parts of the tank may be freely accessible I provide hand hole 63 and man hole 64. I determine the height of water in the chamber below the weir by gage glass 65.

To maintain within the meter substantially the pressure conditions of the feed water heater, condenser or other supply of the metered water I provide for pressures above the atmospheric or for a vacuum as desired within the meter chambers. Obviously the conditions of intended use will determine whether pressure above the atmosphere, vacuum or atmospheric pressure or a combination of pressure or vacuum conditions is to be provided for.

Where atmospheric pressure is to be maintained the chambers will be freely connected with the atmosphere. Where pressure is desired above that of the atmosphere, as will occur where open feed water heaters afford the supply and the pressure transmitted therefrom is to be maintained in a meter to gain the benefit of the increased temperature and head of the water, I provide for protection against excessive pressures by any suitable safety valve 66, which I have shown as controlled by weight 67 adjustable upon the rod 68. I avoid conditions of vacuum by a simple check or flap valve 69 shown in Fig. 5, in which pressure less than atmospheric pressure will permit the opening of the valve due to the greater exterior (atmospheric) pressure. I also avoid the excessive accumulation of air within the meter chambers by thermostatic valve 70 open at lower temperatures but closed by reason of the increased temperature when the temperature exceeds 212°, the temperature at which pressures above the atmospheric pressure begin.

Where vacuum conditions are to be met by the meter I provide against excessive pressures within the chambers by the same character of check or flap valve as shown at 69 except that I turn it the opposite way. The safety valve and thermostatic valve are not required for this use.

It will be evident that I make it possible to transmit to the pump substantially the same pressure and temperature conditions as exist in the open feed water heater, condenser or other source of supply of water to be measured, obtaining the benefit of previous temperature and pressure conditions where desired.

It will be evident that I am enabled to control conditions of pressure within the various chambers of a gravity meter and to maintain the same conditions upon all of the surface within the meter, so that the registration of the meter will not be affected by changes in temperature and pressure conditions.

I believe that I am the first to provide float-actuated inlet water control in a meter which is subjected to pressures above the atmosphere. In general, I attain safety without sacrifice of the advantages sometimes obtained by direct connection of the meter with any chamber in the source of supply, whose pressure might fluctuate greatly. Where the source is an open water heater, for example, I secure all of the advantage of inclusion of the meter within the heater or connection of the air space in the meter with the steam space of the heater without subjecting my meter to the dangers of excessive pressure which are present in feed water heaters, whether from live steam leaking into the heater or from other causes. My float valve control of the water inlet and safety valve protection for the meter chambers are additional safeguards for a meter already freed from the usual dangers by not being connected with the steam space of the feed water heater directly and not at all except through the feed water pipe. It is not necessary, therefore, for me to construct my meter to withstand the same strains provided for in feed water heaters.

It will be evident that I have made it possible to place the weir meter tank in communication with an open feed water heater or other source of supply and, without danger, to maintain in the tank substantially the same conditions of pressure and temperature as are present as a mean in the source of supply. I smooth out the irregularities due to sudden or extreme temperature and pressure changes in the heater before the water enters the meter, without losing the thermal values of the heat units available, which, with the pressures therefrom are transmitted to the pump. I relieve from interference by initial air, and, when the temperature exceeds the boiling point, provide a vapor cushion which tends to make the pressures and temperatures in the meter tank uniform, notwithstanding some possible variation in the pressures and temperatures at which the water is received from the source of supply. My increased storage for the water below the weir further equalizes the temperatures for the pump and the uniform pressure upon the surfaces of the water both above and below the weir, corresponding, as indicated, substantially with the mean pressure in the source of supply, insures accurate measuring by the meter without interference by pressure and temperature conditions.

My weir meter is protected against air pressure as well as vacuum, insuring a minimum of air present after the boiling temperature has been reached and avoiding feeding of air to the pump, except such slight amount as may be entrained by the feed water in its entry after boiling temperature has been exceeded, thus duplicating to the pump in this regard the conditions of feed water supplied to the meter.

Whereas free vapor communication between the open heater and the meter tank results in co-existing variations in pressure and temperature within the heater and meter without any damping effect of the meter upon these surges, it will be evident that my invention provides for reduction of the extent of temperature and pressure changes within the meter and thus tends to equalize conditions not only in the meter, but in the heater also.

Having thus described my invention, what I claim as new and desire to secure by Letters Patent is:—

1. In a device of the character stated, an open feed water heater, a closed meter tank, a measuring device therein including a weir, a single connection between the heater and meter providing for water flow between, a valve in the connection, float controlled means connected with said valve for increasing or decreasing the flow of water through the connection according to the height of water beyond the weir in the direction of water flow and a safety valve protecting the tank.

2. In a device of the character stated, an open feed water heater, a closed meter tank having a weir measuring compartment and a storage compartment, a single connection between the heater and measuring compartment of the meter, providing for flow of water between, a valve in the connection and float means connected with said valve for increasing or diminishing the flow of water from the heater to the meter according to the height of storage water in the meter.

3. In a device of the character stated, an open feed water heater, a closed meter tank having a weir and measuring and storage compartments therein, a single connection between the heater and meter providing for flow of water therebetween, means for increasing or diminishing the flow of water through the connection in proportion to the height of storage water in the meter and a vacuum break in the meter tank.

4. In a device of the character stated, an open feed water heater, a closed meter tank having measuring and storage compartments therein and gravity flow from one to the other, a single connection between the heater and meter, feeding water between, means for controlling the flow of water through the connection in proportion to the height of storage water in the meter and a thermostatic valve in the meter tank.

5. In a device of the character stated, an open feed water heater, a closed meter tank having receiving and storage compartments having free vapor communication, a single connection between the heater and the receiving chamber of the meter providing for flow of water therebetween, a float controlled valve increasing or decreasing the flow through this connection in proportion to the height of water in the storage compartment, and a safety valve and a thermostatic valve both controlling communication between the inside and outside of the meter tank.

6. In a device of the character stated, an open feed water heater, a closed meter tank having receiving and storage compartments therein, a single connection between the heater and meter tank providing for flow of water therebetween, a float controlled valve increasing or decreasing the flow of water from the heater to the meter in proportion to the height of storage water in the meter and a vacuum break in the meter tank.

7. In a device of the character stated, an open feed water heater, a closed meter tank having receiving and storage compartments, a single connection between the heater and meter providing for flow of water therebetween, a float controlled valve increasing or decreasing the flow of water through this connection, in proportion to the height of water in the storage of the meter and a vacuum break and thermostatic valve both controlling passage of fluid betewen the outside and inside of the meter tank.

8. In a device of the character stated, an open feed water heater, a closed meter tank, a receiving compartment in the tank, a storage compartment in said tank, a single connection between the heater and the meter tank opening into the receiving compartment in the tank, a valve in said connection adapted when closed to dam up the water in the heater and when opened to release this water and permit free flow of water therebetween, an outlet for said storage compartment, a float in the storage compartment and connections between the float and valve, giving the valve closing movement when the water level rises in the storage compartment and opening movement when the water level falls therein.

DAVID ROBERT YARNALL.

Witnesses:
WM. STEELL JACKSON,
SAMUEL C. MILLNARD.

Copies of this patent may be obtained for five cents each, by addressing the "Commissioner of Patents, Washington, D. C."